United States Patent
Wirnitzer et al.

(10) Patent No.: US 10,491,044 B2
(45) Date of Patent: Nov. 26, 2019

(54) INDUCTION CHARGING DEVICE FOR INDUCTIVELY TRANSMITTING ENERGY TO AN INDUCTION RECHARGEABLE BATTERY DEVICE, AND METHOD FOR INDUCTIVELY CHARGING AN INDUCTION RECHARGEABLE BATTERY DEVICE

(71) Applicant: Robert Bosch GmbH, Stuttgart (DE)

(72) Inventors: Bernd Wirnitzer, Friolzheim (DE); Dragan Krupezevic, Stuttgart (DE); Guenter Lohr, Leinfelden-Echterdingen (DE); Juergen Mack, Goeppingen (DE); Martin Gonda, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 116 days.

(21) Appl. No.: 15/750,055

(22) PCT Filed: Jun. 9, 2016

(86) PCT No.: PCT/EP2016/063115
§ 371 (c)(1),
(2) Date: Mar. 12, 2018

(87) PCT Pub. No.: WO2017/021035
PCT Pub. Date: Feb. 9, 2017

(65) Prior Publication Data
US 2018/0233952 A1 Aug. 16, 2018

(30) Foreign Application Priority Data
Aug. 3, 2015 (DE) .......................... 10 2015 214 774

(51) Int. Cl.
*H02J 50/12* (2016.01)
*H02M 3/337* (2006.01)
(Continued)

(52) U.S. Cl.
CPC .......... *H02J 50/12* (2016.02); *H02M 3/3376* (2013.01); *H02M 3/335* (2013.01);
(Continued)

(58) Field of Classification Search
CPC .. H02J 50/12; H02J 50/10; H02J 50/80; H02J 50/40; H02M 3/335; H02M 3/337; H02M 3/3376; H02M 2001/0006
(Continued)

(56) References Cited

U.S. PATENT DOCUMENTS 5,940,280 A * 8/1999 Murai ..................... H02J 7/022
363/132
2010/0070219 A1 * 3/2010 Azancot .................. H02J 5/005
702/62

(Continued)

FOREIGN PATENT DOCUMENTS

DE 102010003703 A1 11/2011
DE 102013212611 A1 12/2014
EP 2868516 A1 5/2015

OTHER PUBLICATIONS

International Search Report dated Jul. 17, 2016, of the corresponding International Application PCT/EP2016/063115 filed Jun. 9, 2016.

*Primary Examiner* — Fritz M Fleming
*Assistant Examiner* — Jagdeep S Dhillon
(74) *Attorney, Agent, or Firm* — Norton Rose Fulbright US LLP; Gerard Messina

(57) ABSTRACT

An induction charging device and a method for inductively transmitting energy to an induction rechargeable battery device, with at least one primary oscillating circuit that includes at least one charging coil, and with a control/regulation unit for controlling the primary oscillating circuit with an inverter circuit. An excitation frequency of an output signal of the inverter circuit made up of half-waves essen- (Continued)

tially corresponds to a resonant frequency of the primary oscillating circuit. The induction charging device provides that, for reducing a charging current, the control/regulation unit, after an end-of-charge voltage of the induction rechargeable battery device is reached, controls the inverter circuit so that the output signal periodically sets at least one first half-wave to a high value, and an odd plurality of successive half-waves is then immediately set to a value that is low compared to the high value.

11 Claims, 6 Drawing Sheets

(51) Int. Cl.
 *H02M 3/335* (2006.01)
 *H02M 1/00* (2006.01)
(52) U.S. Cl.
 CPC ............... *H02M 2001/0006* (2013.01); *H02M 2001/0032* (2013.01); *H02M 2001/0058* (2013.01); *H02M 2001/0064* (2013.01); *Y02B 70/1433* (2013.01); *Y02B 70/1491* (2013.01); *Y02B 70/16* (2013.01)
(58) Field of Classification Search
 USPC ..... 307/104, 10.1, 10.2, 66, 64, 82, 43, 116; 320/108, 109, 110, 119
 See application file for complete search history.

(56) References Cited

U.S. PATENT DOCUMENTS

| | | | | |
|---|---|---|---|---|
| 2011/0062793 | A1* | 3/2011 | Azancot | H01F 38/14 307/116 |
| 2011/0204845 | A1* | 8/2011 | Paparo | H01F 38/14 320/108 |
| 2013/0147280 | A1 | 6/2013 | Oettinger | |
| 2014/0217816 | A1* | 8/2014 | Okada | H02J 7/025 307/10.1 |
| 2015/0001957 | A1* | 1/2015 | Ichikawa | H01F 27/36 307/104 |
| 2016/0336783 | A1* | 11/2016 | Hsia | H02J 50/12 |

* cited by examiner

INDUCTION CHARGING DEVICE FOR INDUCTIVELY TRANSMITTING ENERGY TO AN INDUCTION RECHARGEABLE BATTERY DEVICE, AND METHOD FOR INDUCTIVELY CHARGING AN INDUCTION RECHARGEABLE BATTERY DEVICE

FIELD OF THE INVENTION

The present invention relates to an induction charging device for inductively transmitting energy to an induction rechargeable battery device, and a method for inductively charging an induction rechargeable battery device.

BACKGROUND INFORMATION

An induction charging apparatus, in particular a hand-held power tool induction charging apparatus, with an induction charging device for inductively charging an induction rechargeable battery device is discussed in DE 102013212611 A1. The inductive transmission of energy takes place via a primary oscillating circuit in the induction charging device and a secondary oscillating circuit in the induction rechargeable battery device. The oscillating circuits are inductively coupled to one another via at least one primary-side charging coil and one secondary-side charging coil, the resonant frequencies of the oscillating circuits ideally being approximately equal. The excitation of the primary oscillating circuit takes place via a rectangular-pulse signal that is formed by half-waves and generated in the induction charging device by an inverter. For this purpose, the inverter is appropriately controlled by a control or regulation unit, the frequency of the exciting rectangular-pulse signal typically being slightly above the resonant frequency of the oscillating circuits. This offers the major advantage of a so-called quasi-resonant operation with correspondingly low EMC interference levels and energy losses. It is also known that only those harmonics of the exciting signal in the proximity of the resonant frequency of the system contribute to a significant charging current. This is the fundamental mode of the rectangular-pulse signal.

A so-called IU or constant current constant voltage (CCCV) charging method for charging a rechargeable battery, in particular a lithium-ion rechargeable battery, is discussed in DE 102010003703 A1. In this method, the rechargeable batteries are charged in a first phase (I charging) at constant current while the charging voltage increases. The current is limited by a current controller of the charging device. After a selected end-of-charge voltage in the rechargeable battery is reached, in a second phase a switch is made from constant current control to voltage control (U charging), in which the rechargeable batteries are further charged at constant voltage and reduced charging current. This second phase is also referred to as the "current tail."

In order to keep the exciting voltage in the current tail from further increasing, in the known induction charging devices the duty cycle of the exciting signal is reduced. However, the advantages of the quasi-resonant operation are thus lost.

SUMMARY OF THE INVENTION

An object of the present invention, therefore, is to achieve a charging current in the current tail (second phase) that is reduced compared to the charging current of the I charging (first phase), without discontinuing the quasi-resonant operation.

According to the present invention, it is provided that, after an end-of-charge voltage of the induction rechargeable battery device for reducing the charging current is reached, the control or regulation unit controls the inverter circuit in such a way that the output signal periodically sets at least one first half-wave to a high value, and an odd plurality of successive half-waves is then immediately set to a value that is reduced compared to the high value. Smaller charging currents in the current tail are thus possible while maintaining the quasi-resonant operation having the known advantages.

An inverter circuit is understood in particular to mean a half-bridge that includes a high-side switch and a low-side switch. However, other inverter circuits, for example in the form of H bridges, are conceivable. Bipolar or MOS field effect transistors or also mixed forms such as IGBTs are generally used as high-side and/or low-side switches. However, the present invention is not limited either to the specific design of the inverter circuit or to the switches used therein.

The exciting output signal of the inverter circuit is generally a rectangular-pulse signal, but may also assume other pulse width-modulated (PWM) signal shapes in which the values of the switching states are different. In the case of a rectangular-pulse signal, it is customary that a high value (pulse) results when the high-side switch is switched through and the low-side switch is blocked, while a value (pause) that is lower compared to the high value is achieved by blocking the high-side switch and switching through the low-side switch. The high value is generally also referred to as "high," and the value that is lower compared to the high value is referred to as "low." These types of PWM signals are known to those skilled in the art, and therefore a more detailed discussion is not provided here. The same applies for the frequency of such a signal as well as the associated half-waves and period, pulse, and pause durations. This will be discussed in part in greater detail in the following description.

According to the present invention, it is provided that a first half-wave having a high value is periodically followed in succession by at least three half-waves having a reduced value compared to the high value. In this way, a charging current that is lower than the charging current of the first phase by one-half may be achieved in the second phase. A further reduction of the charging current to one-third of the charging current of the first phase is achievable when an odd number of successive first half-waves, in particular three half-waves, having a high value is periodically followed in succession by at least three half-waves having a reduced value compared to the high value.

With particular advantage with regard to the quasi-resonant operation, the control or regulation unit holds the excitation frequency of the output signal of the inverter circuit essentially constant after the end-of-charge voltage is reached. However, in particular in conjunction with the combination of an odd number of successive half-waves having a high value and an odd number of successive half-waves having a reduced value compared to the high value, for further reducing the charging current it may be advantageous when the quasi-resonant operation is discontinued by detuning the excitation frequency. This operating mode is referred to below as the frequency shift.

Furthermore, an induction charging apparatus, in particular a hand-held power tool induction charging apparatus, that includes at least one induction charging device according to the present invention and an induction rechargeable battery device to be charged by the induction charging device is provided.

Moreover, the present invention relates to a method for inductively charging an induction rechargeable battery device with the aid of an induction charging device that includes an inverter circuit and at least one primary oscillating circuit. To this end, the method according to the present invention, having the above-described advantages, includes the following steps:

charging the induction rechargeable battery device in a first phase with an essentially constant charging current in such a way that an excitation frequency of an output signal, made up of half-waves, of the inverter circuit for controlling the primary oscillating circuit essentially corresponds to a resonant frequency of the primary oscillating circuit, charging the induction rechargeable battery device in a second phase after an end-of-charge voltage of the induction rechargeable battery device is reached, with a charging current that is reduced compared to the charging current of the first phase in such a way that the output signal of the inverter circuit periodically sets at least one first half-wave to a high value, and an odd plurality of successive half-waves is then immediately set to a value that is reduced compared to the high value.

It is provided that a first half-wave having a high value is followed in succession by at least three half-waves having a value that is reduced compared to the high value. It is particularly advantageous when an odd number of successive first half-waves having a high value is followed in succession by at least three half-waves having a value that is reduced compared to the high value.

The method provides that the excitation frequency of the output signal of the inverter circuit remains essentially constant after the end-of-charge voltage is reached. However, for further reduction of the charging current, the excitation frequency of the output signal of the inverter circuit may also be detuned with respect to the resonant frequency after the end-of-charge voltage is reached.

Further advantages of the present invention result from the features stated in the dependent claims, and from the drawings and the following description.

The present invention is explained below by way of example with reference to FIGS. 1 through 5. Identical reference numerals in the figures indicate the same components having the same operating principle.

DETAILED DESCRIPTION

Figure 1:
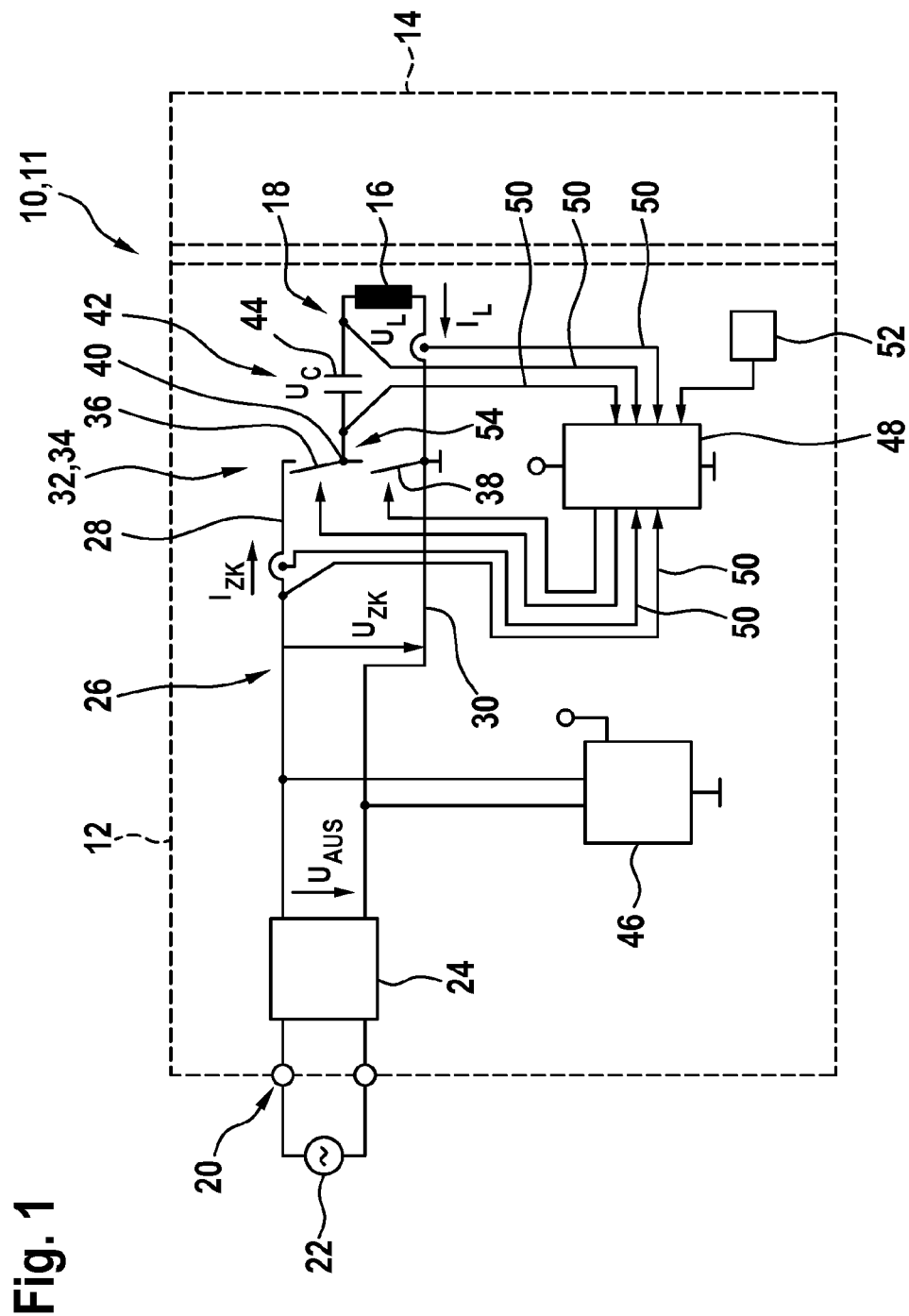
FIG. 1 shows a block diagram of an induction charging apparatus according to the present invention, with an induction charging device according to the present invention for inductively charging an induction rechargeable battery device.

FIG. 1 shows an induction charging apparatus 10 according to the present invention, in particular in the form of a hand-held power tool induction charging apparatus 11, with an induction charging device 12 and an induction rechargeable battery device 14 to be inductively charged. Induction charging device 10 forms the primary side of induction charging apparatus 10, while induction rechargeable battery device 14 represents the secondary side thereof. Many different types of hand-held power tools may typically be inductively charged. Without limiting the present invention, examples include screwdrivers, drills, impact drills, hammers, angle grinders, random orbital sanders, jigsaws, hand-held circular saws, reciprocating saws, polishers, etc., as well as garden tools such as lawnmowers and hedge trimmers, or lighting devices for construction sites. In principle, the present invention is applicable to all possible inductively charged hand-held power tools that include permanently installed or replaceable rechargeable batteries. However, it may also be used for other induction rechargeable battery devices that appear meaningful to those skilled in the art.

Induction rechargeable battery device 14, which will not be explained in greater detail here since it is generally known to those skilled in the art, is typically mounted on a top side of a housing, not shown, of induction charging device 10, and is wirelessly charged via a charging coil 16 that is part of a primary oscillating circuit 18. For this purpose, induction rechargeable battery device 14 includes a secondary oscillating circuit, not illustrated, with a further coil for receiving the energy that is radiated on the primary side. It is noted that induction rechargeable battery device 14 does not necessarily have to be mounted on the housing of induction charging device 10.

On the power grid side, induction charging device 10 is connected in a known manner to an alternating voltage grid 22 via a terminal 20, such as a safety contact plug, and supplied with power. Terminal 20 is connected to a power supply unit 24 which transforms an alternating voltage of alternating voltage grid 22 into a direct voltage $U_{AUS}$ and rectifies same. Direct voltage $U_{AUS}$ is used for supplying power to an intermediate circuit 26 as intermediate circuit voltage $U_{ZK}$ between direct current branches 28 and 30, direct current branch 30 corresponding to a ground potential (low) and direct current branch 28 corresponding to a supply potential (high). Connected between direct current branches 28 and 30 is an inverter circuit 32, in the form of a half-bridge 34, that is made up of a high-side switch and a low-side switch 36 and 38, respectively. Switches 36, 38 of inverter circuit 32 may be configured as bipolar transistors or metal oxide semiconductor field effect transistors (MOSFETs). However, insulated-gate bipolar transistors (IGBTs) or the like are also suitable. At a center tap 40 of inverter circuit 32, a primary oscillating circuit 42 made up of a capacitor 44 and charging coil 16, mentioned at the outset, connected thereto in series, is connected to direct current branch 30, against ground potential, in such a way that the primary oscillating circuit is situated in parallel to low-side switch 38. However, it is also conceivable to connect the oscillating circuit in parallel to high-side switch 28.

A regulation unit 48 connected to an auxiliary power supply 46 is now used according to the present invention for controlling switches 36, 38 of inverter circuit 32. In principle, auxiliary power supply 46 may also be dispensed with. The auxiliary power supply is used primarily for allowing regulation unit 48 to operate in a standby mode, even after charging device 12 is switched off, to ensure low power consumption.

Regulation unit 46 includes various control inputs 50 via which intermediate circuit voltage $U_{ZK}$, an intermediate circuit current $I_{ZK}$, a capacitor voltage $U_c$ across capacitor 44, a charging voltage $U_L$ across charging coil 16, and a charging current $I_L$ are monitored by charging coil 16 and capacitor 44. In addition, information concerning the state of charge, the temperature, and/or the power consumption of induction rechargeable battery device 14 may be fed via an interface 52. Furthermore, information concerning the type and number of rechargeable battery cells of induction rechargeable battery device 14 may be transmitted. For this purpose, interface 52 may be configured as a wireless NFC or BTLE interface or the like. In addition, data transmission from the secondary-side coil to the primary-side charging coil 16 is conceivable. In principle, uncontrolled operation of induction charging device 12 is also conceivable, so that regulation unit 46 operates strictly as a control unit. However, a regulated operation generally may be used.

Figure 2:
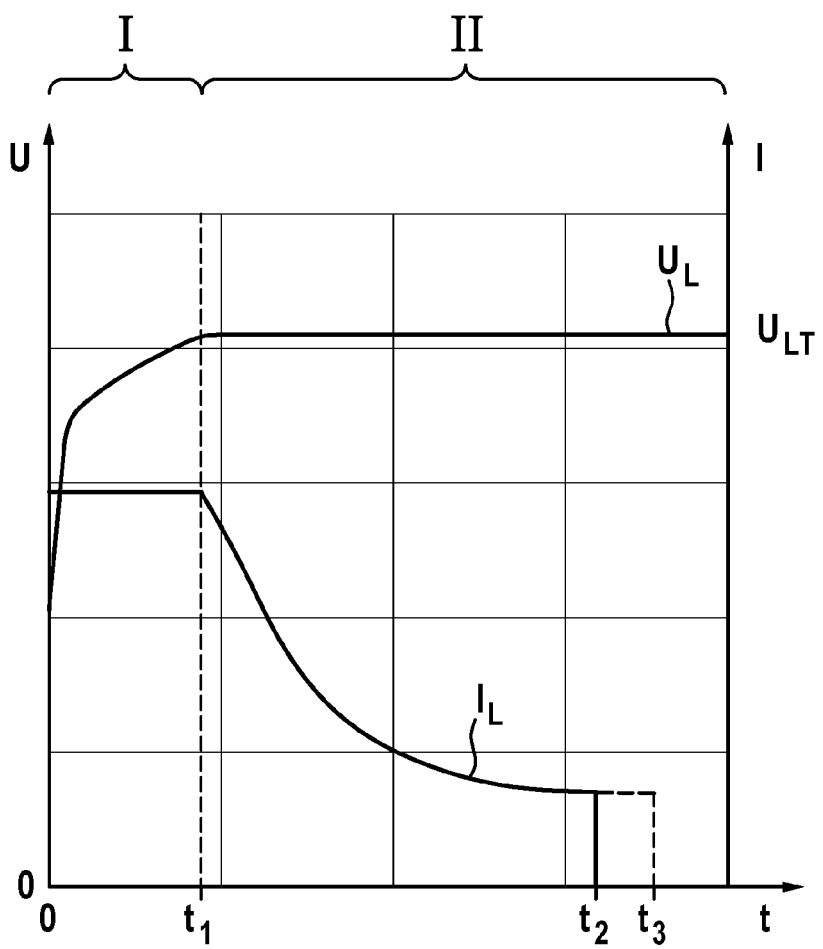
FIG. 2 shows a time diagram of an IU charging method according to the related art.
Figure 3:
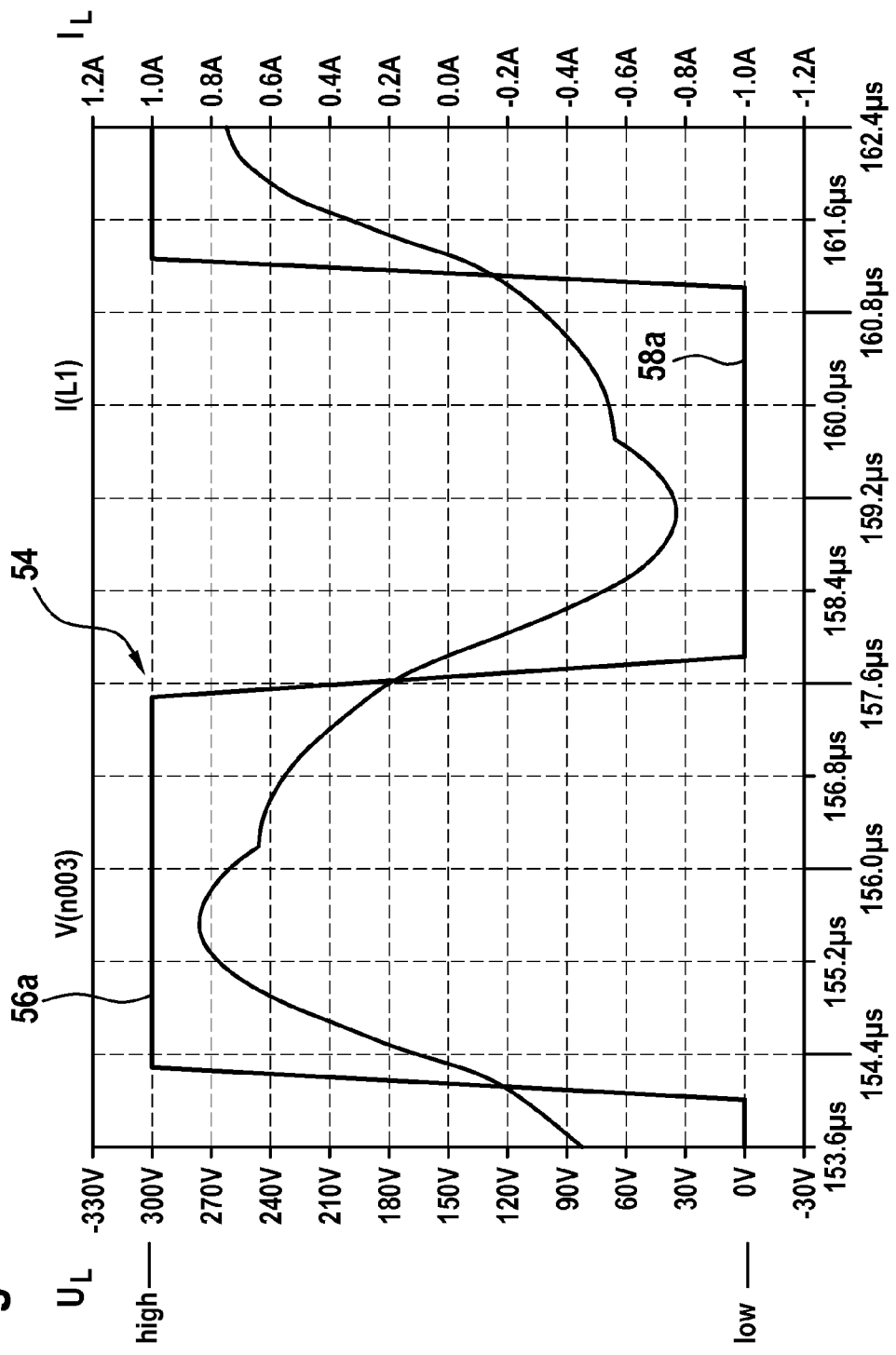
FIG. 3 shows a diagram of the time curve of an output signal of an inverter circuit for controlling an oscillating circuit during a first phase of the IU charging method.

With reference to FIGS. 2 and 3, regulation unit 46 now controls high-side and low-side switches 36, 38 in such a way that in a first phase I (time period t=0 to $t_1$), induction rechargeable battery device 14 is initially charged with a constant charging current $I_L$. For this purpose, inverter circuit 32 chops rectified intermediate circuit voltage $U_{ZK}$ into a square-wave voltage at its center tap 40, referred to below as output signal 54. In the present case for a half-wave 56a, output signal 54 is switched to the value "high," and for a subsequent half-wave 58a is switched to the value "low." This results in maximum possible charging voltage $U_L$ and maximum charging current $I_L$. However, pulse-pause ratios and duty cycles of pulse width-modulated output signal 54 for inductively charging at lower values and longer charging cycles are also possible, for example to provide more protection for induction rechargeable battery device 14.

Charging voltage $U_L$ now increases continuously in first phase I. It is important for optimal inductive energy transmission that inverter circuit 32 operates in quasi-resonant mode, i.e., that excitation frequency $f_a$ of its output signal 54 essentially corresponds to a resonant frequency $f_R$ of primary oscillating circuit 18, and may be slightly above resonant frequency $f_R$. For this purpose, in addition to the above variables, regulation unit 46 ascertains excitation frequency $f_a$ of output signal 54 and resonant frequency $f_R$ of primary oscillating circuit 18 at regular intervals.

Figure 4:
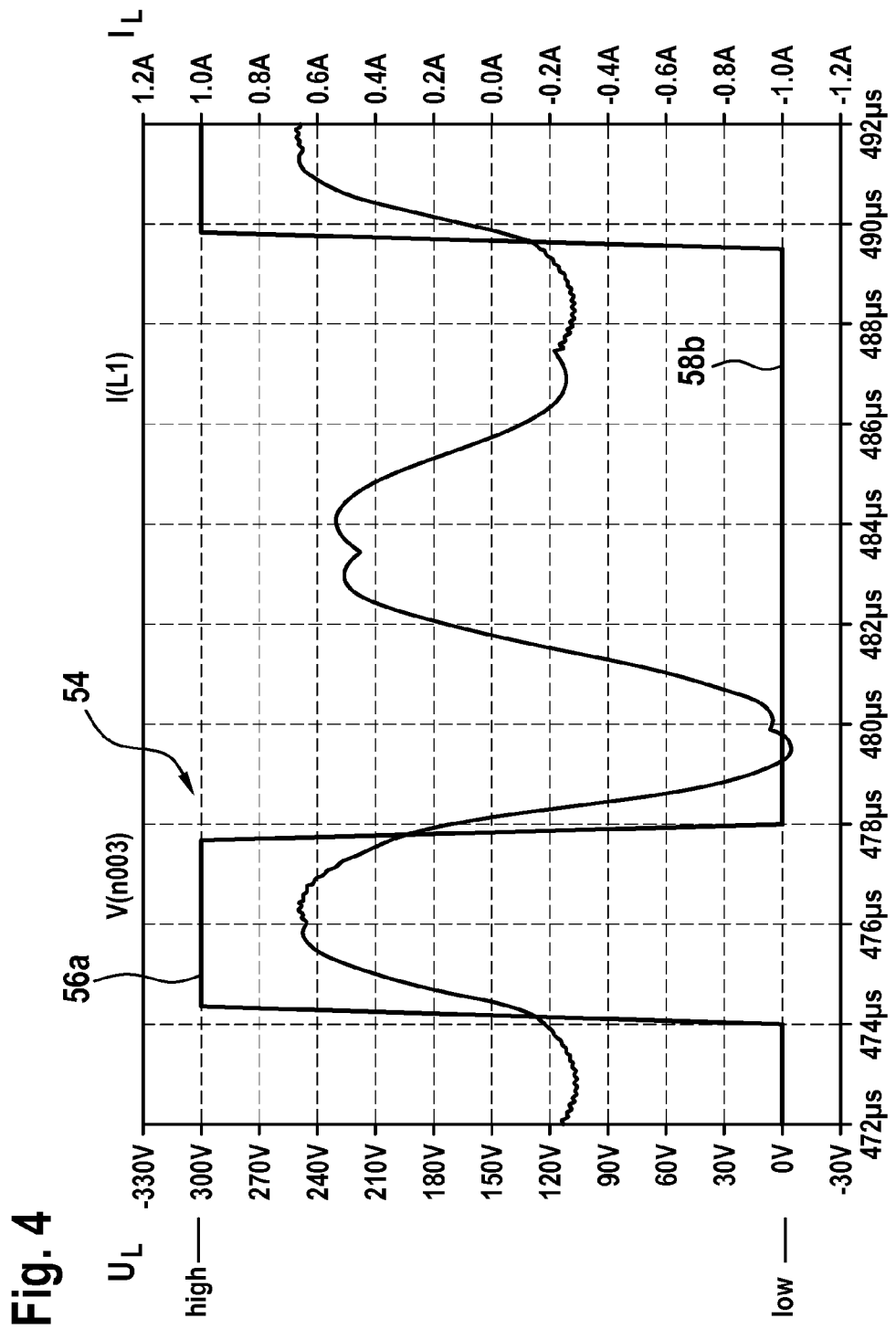
FIG. 4 shows a diagram of the time curve of an output signal according to the present invention of the inverter circuit for controlling the oscillating circuit during a second phase of the IU charging method, in a first exemplary embodiment.
Figure 5:
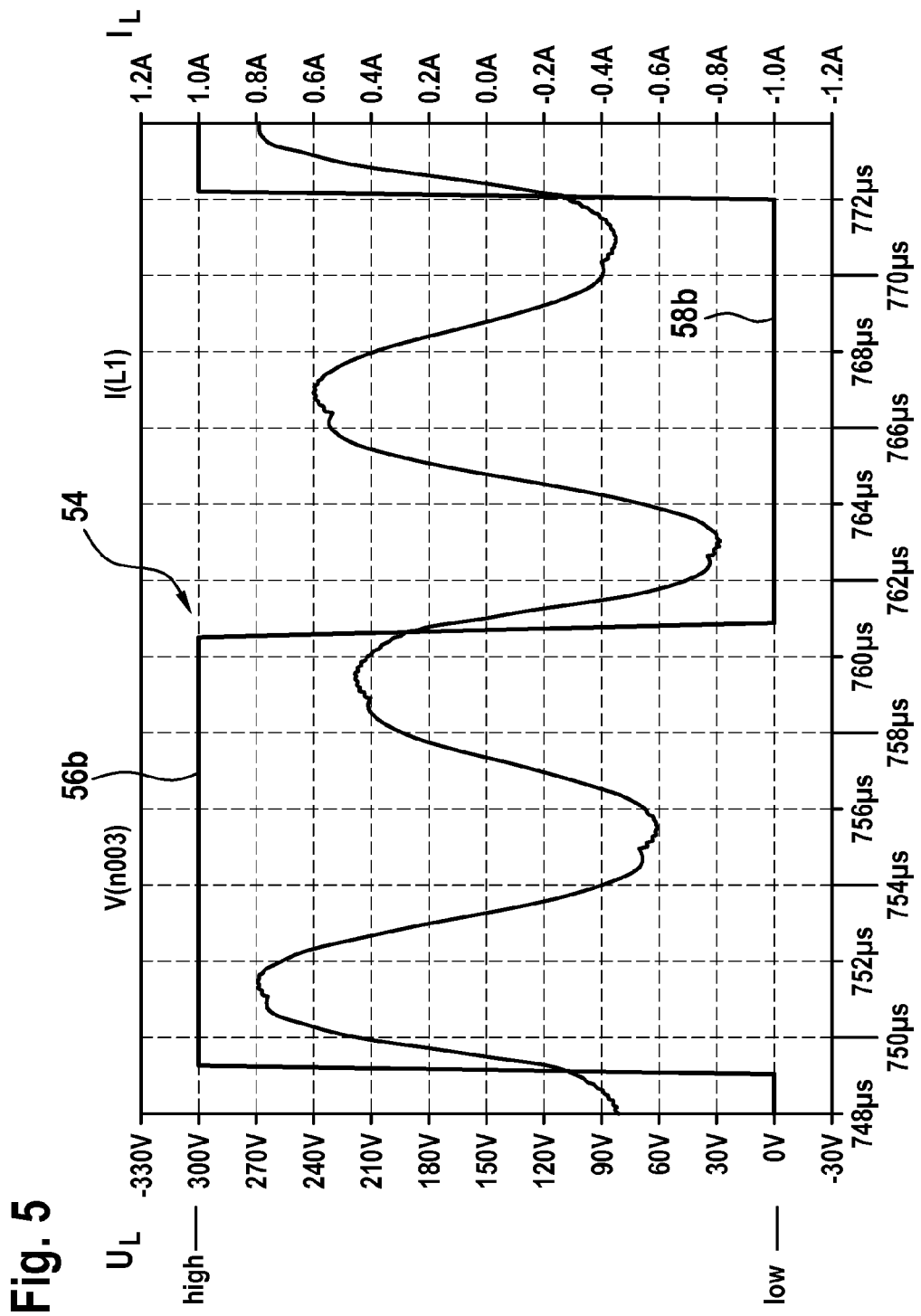
FIG. 5 shows a diagram of the time curve of an output signal according to the present invention of the inverter circuit for controlling the oscillating circuit during a second phase of the IU charging method, in a second exemplary embodiment.

As soon as charging voltage $U_L$ has reached a predefinable maximum value, referred to below as end-of-charge voltage $U_{LT}$, at point in time $t_1$, a switch is made from the current-controlled charging method to a voltage-controlled charging method, in that, in second phase II following first phase I, induction rechargeable battery device 14 is charged with charging current $I_L$ that is reduced compared to charging current $I_L$ of first phase I, until induction charging device 12 is switched off at points in time $t_2$ or $t_3$. According to the present invention, with reference to FIG. 4, for this purpose it is provided that, while maintaining the quasi-resonant operation, after end-of-charge voltage $U_{LT}$ is reached in second phase II, output signal 54 of inverter circuit 18 periodically sets at least one first half-wave to a high value "high," and an odd number of successive half-waves 58b is then immediately set to a value "low" that is reduced compared to the high value "high." This is shown in FIG. 5 for the case of a half-wave "high" and three directly contiguous, successive half-waves "low." At the same time, it is apparent from the time curve of charging current $I_L$ that this time curve is reduced by one-half compared to the case shown in FIG. 3 (a half-wave "high" in alternation with a half-wave "low").

Accordingly, a general condition for controlling inverter circuit 18 for the quasi-resonant operation during the current tail in second phase II is that switching states "low" must be periodically applied for an odd plurality of half-waves. According to FIG. 5, this results in a further reduction of charging current $I_L$ to one-third of charging current $I_L$ according to FIG. 3, when three successive half-waves 56b with the switching state "high" are periodically followed in succession by three half-waves 58c with the switching state "low."

Figure 6:
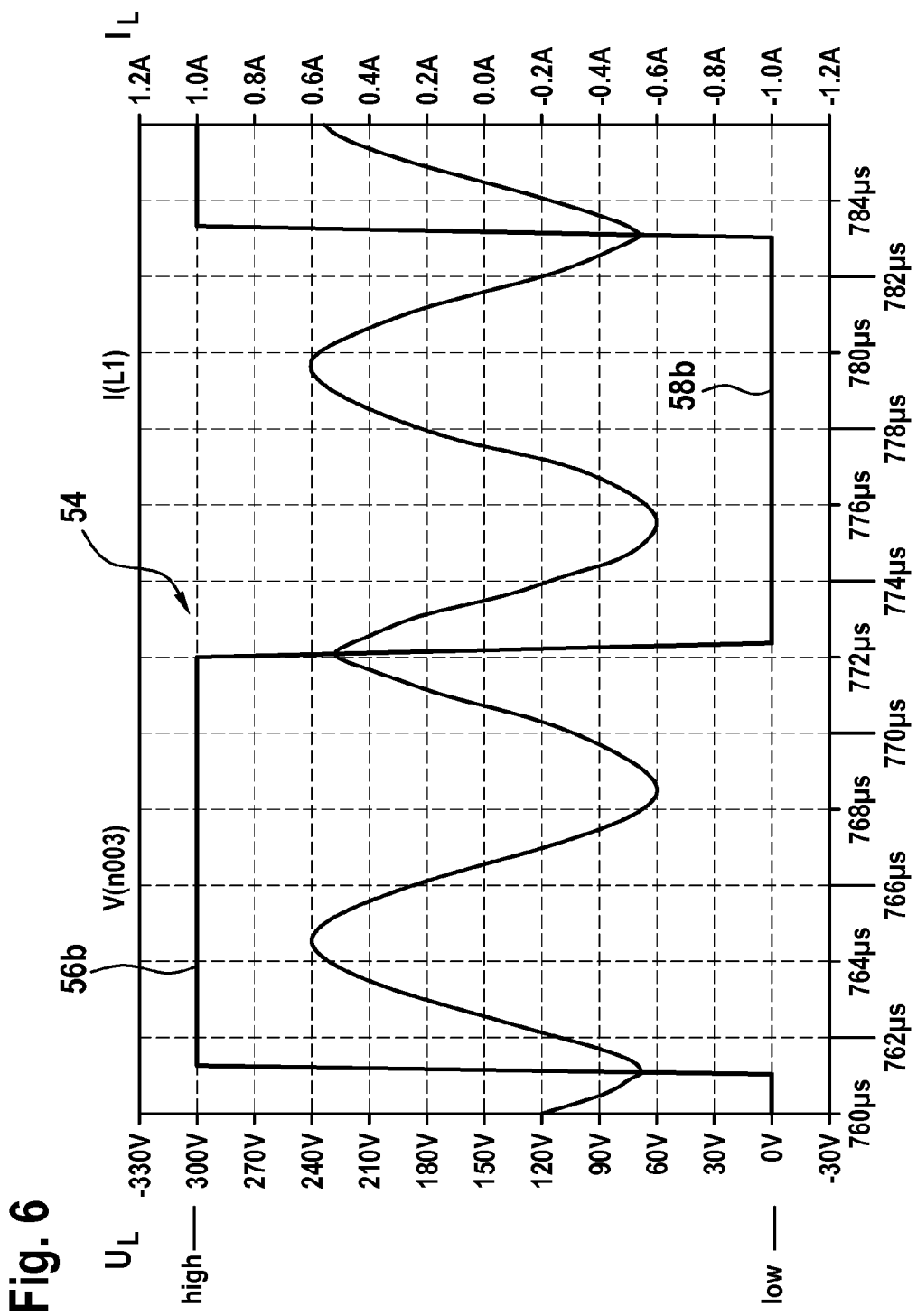
FIG. 6 shows a diagram of the time curve of an output signal according to the present invention of the inverter circuit for controlling the oscillating circuit during a second phase of the IU charging method, in a third exemplary embodiment.

Even smaller charging currents $I_L$ are achievable when a frequency shift is additionally carried out, i.e., the quasi-resonant operation is discontinued. This is shown in FIG. 6, in which three half-waves 58c with the switching state "low" are periodically followed in succession by three successive half-waves 56b with the switching state "high."

Lastly, it is pointed out that the exemplary embodiments shown are not limited to FIGS. 1 through 6 or to the half-wave sequences shown. Thus, similar results are also achievable for five and more uneven, successive half-waves. In addition, the present invention is likewise applicable to inductive charging operations in suitcases, packages, or the like.

What is claimed is:

1. An induction charging device for inductively transmitting energy to an induction rechargeable battery device, comprising:
at least one primary oscillating circuit having at least one charging coil and having a control/regulation unit to control the primary oscillating circuit with an inverter circuit;
wherein an excitation frequency of an output signal of the inverter circuit made up of half-waves essentially corresponding to a resonant frequency of the primary oscillating circuit,
wherein for reducing a charging current, the control/regulation unit, after an end-of-charge voltage of the induction rechargeable battery device is reached, controls the inverter circuit so that the output signal periodically sets at least one first half-wave to a high value, and an odd plurality of successive half-waves is then immediately set to a value that is low compared to the high value.

2. The induction charging device of claim 1, wherein a first half-wave having a high value is periodically followed in succession by at least three half-waves having a reduced value compared to the high value.

3. The induction charging device of claim 1, wherein an odd number of successive first half-waves having a high value is periodically followed in succession by at least three half-waves having a reduced value compared to the high value.

4. The induction charging device of claim 1, wherein the control or regulation unit holds the excitation frequency of the output signal of the inverter circuit essentially constant after the end-of-charge voltage is reached.

5. The induction charging device of claim 3, wherein the control/regulation unit detunes the excitation frequency of the output signal of the inverter circuit with respect to the resonant frequency after the end-of-charge voltage is reached.

6. An induction charging apparatus, which is a hand-held power tool induction charging apparatus, comprising:
at least one induction charging device for inductively transmitting energy to an induction rechargeable battery device, including:
at least one primary oscillating circuit having at least one charging coil and having a control/regulation unit to control the primary oscillating circuit with an inverter circuit;
wherein an excitation frequency of an output signal of the inverter circuit made up of half-waves essentially corresponding to a resonant frequency of the primary oscillating circuit,
wherein for reducing a charging current, the control/regulation unit, after an end-of-charge voltage of the induction rechargeable battery device is reached, controls the inverter circuit so that the output signal periodically sets at least one first half-wave to a high value, and an odd plurality of successive half-waves is then immediately set to a value that is low compared to the high value; and
an induction rechargeable battery device.

7. A method for inductively charging an induction rechargeable battery device with an induction charging device, which includes an inverter circuit and at least one primary oscillating circuit, the method comprising:
charging the induction rechargeable battery device in a first phase with an essentially constant charging current so that an excitation frequency of an output signal, made up of half-waves, of the inverter circuit for controlling the primary oscillating circuit essentially corresponds to a resonant frequency of the primary oscillating circuit; and charging the induction rechargeable battery device in a second phase, after an end-of-charge voltage of the induction rechargeable battery device is reached, with a charging current that is reduced compared to the charging current of the first phase so that the output signal of the inverter circuit periodically sets at least one first half-wave to a high value, and an odd plurality of successive half-waves is then immediately set to a value that is reduced compared to the high value.

8. The method of claim 7, wherein a first half-wave having a high value is periodically followed in succession by at least three half-waves having a reduced value compared to the high value.

9. The method of claim 7, wherein an odd number of successive first half-waves having a high value is periodically followed in succession by at least three half-waves having a reduced value compared to the high value.

10. The method of claim 7, wherein the excitation frequency of the output signal of the inverter circuit remains essentially constant after the end-of-charge voltage is reached.

11. The method of claim 9, wherein the excitation frequency of the output signal of the inverter circuit is detuned with respect to the resonant frequency after the end-of-charge voltage is reached.

* * * * *